United States Patent
Tate, Jr.

(10) Patent No.: US 7,640,148 B2
(45) Date of Patent: Dec. 29, 2009

(54) METHOD OF MODELING VEHICLE PARAMETER CYCLES

(75) Inventor: Edward D. Tate, Jr., Grand Blanc, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 418 days.

(21) Appl. No.: 11/031,363

(22) Filed: Jan. 7, 2005

(65) Prior Publication Data

US 2006/0155541 A1 Jul. 13, 2006

(51) Int. Cl.
*G06G 7/56* (2006.01)
*G06F 7/60* (2006.01)

(52) U.S. Cl. ............................... 703/8; 703/2
(58) Field of Classification Search .................. 703/9, 703/8, 2

See application file for complete search history.

(56) References Cited

U.S. PATENT DOCUMENTS

| | | | | |
|---|---|---|---|---|
| 5,251,161 | A * | 10/1993 | Gioutsos et al. | 703/2 |
| 6,411,908 | B1 * | 6/2002 | Talbott | 702/34 |
| 6,535,833 | B1 * | 3/2003 | Syrjarinne | 702/150 |
| 6,735,557 | B1 * | 5/2004 | Castellar et al. | 703/5 |
| 6,772,104 | B1 * | 8/2004 | White et al. | 703/8 |
| 2003/0036891 | A1 * | 2/2003 | Aragones et al. | 703/8 |
| 2003/0130923 | A1 * | 7/2003 | Charnley, Jr. | 705/36 |
| 2004/0158592 | A1 * | 8/2004 | Nikitin et al. | 708/400 |
| 2005/0038638 | A1 * | 2/2005 | Comaniciu et al. | 703/2 |

OTHER PUBLICATIONS

Kaneko et al., 1995, IEEE, The Judgment of the Traffic Condition by Using the cluster Analysis, p. 218-224.*

* cited by examiner

*Primary Examiner*—Paul L Rodriguez
*Assistant Examiner*—Eunhee Kim (57) ABSTRACT

A method of modeling a cycle of a vehicle parameter includes generating a plurality of training sets and partially classifying elements of each training set based on a present value of the vehicle parameter and a subsequent change in the vehicle parameter. The method further includes reducing the plurality of training sets to a corresponding plurality of parameter sets based on the elements and defining a plurality of statistical groups of the parameter sets based on a value and a history of that value.

17 Claims, 6 Drawing Sheets

METHOD OF MODELING VEHICLE PARAMETER CYCLES

FIELD OF THE INVENTION

The present invention relates to stochastic modeling of vehicle operating parameters, and more particularly to an approximate Markov model of operating parameter cycles.

BACKGROUND OF THE INVENTION

Vehicle powertrains generally include single or multiple powerplants that produce drive torque to drive a wheel or wheels. Drive torque produced by the powerplant(s) is transferred to the wheel(s) via a driveline. Driveline components include, but are not limited to, a transmission, a power take-off unit (PTU), a transfer case, constant-velocity joints (CVJs), halfshafts, propshafts, differentials and torque biasing systems (e.g., clutch systems). One of the challenges in designing vehicle powertrains is understanding how the powertrain will be used.

Powertrain control systems must repeatedly make control decisions based on uncertain or variable operating parameters including, but not limited to, operator input (e.g., throttle). The control decisions generally seek to optimize powertrain performance and energy consumption while achieving the operator command. Often, there is a trade-off between some immediate benefits and possible future benefits. Further, present control decisions impact future control decisions and benefits.

Stochastic dynamic programming (SDP) is implemented in the design of the control systems. A key concept that enables the use of SDP in control system design is a model of the stochastic properties of the usage and an estimation that works in real-time to estimate the state in the stochastic model when the control is used in the vehicle. Traditional models, including Markov models, are prohibitively large and generate an extremely large number of free variables. This limits the capability of the control system. For example, processors that process the traditional models would be insufficient and more powerful processors would be required. This results in additional cost and processing complexity.

SUMMARY OF THE INVENTION

Accordingly, the present invention provides a method of modeling a cycle of a vehicle parameter. The method includes generating a plurality of training sets and partially classifying elements of each training set based on a present value of the vehicle parameter and a subsequent change in the vehicle parameter. The method further includes reducing the plurality of training sets to a corresponding plurality of parameter sets based on the elements and defining a plurality of statistical groups of the parameter sets based on a value and a history of that value.

In one feature, the plurality of training sets each include a plurality of parameter vectors.

In another feature, the method further includes weighting each of the training sets whereby more recent elements of a particular training set have a greater influence on the statistical groups than earlier elements of the particular training set.

In still another feature, the method further includes approximating each of the training sets based on respective lower order representations of each training set.

In yet other features, the step of defining a plurality of statistical groups includes performing cluster analysis on the training sets to generate the statistical groups. The cluster analysis is performed based on the value and a plurality of historical values.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiment is merely exemplary in nature and is in no way intended to limit the invention, its application, or uses. For purposes of clarity, the same reference numbers will be used in the drawings to identify similar elements.

The present invention provides a conditional probability model (CPM) that can be implemented to predict a future state of a vehicle operating parameter. The CPM is a stochastic model that can be characterized as an approximation of a Markov model. The term Markov model or hidden Markov model (HMM) refers to a finite set of states, each of which is associated with a probability distribution. The probability distribution is multi-dimensional. Transition probabilities govern transitions among the states. An observation can be generated for a particular state based on the associated probability distribution.

The CPM of the present invention enables the implementation of control systems that rely on predictions of vehicle parameters or statistical descriptions of vehicle parameters. The CPM can be applied to model the stochastic nature of vehicle usage for stochastic dynamic programming (SDP). The CPM is particularly useful for this purpose in the case of hybrid-electric vehicles (HEVs). The CPM can also be implemented as an estimator of the stochastic state for use in control laws. Additionally, the CPM can be used as a preview generator that generates previews of probable future usage of the vehicle. The CPM can be adaptively updated to account for the usage characteristics of particular a vehicle.

Figure 1:
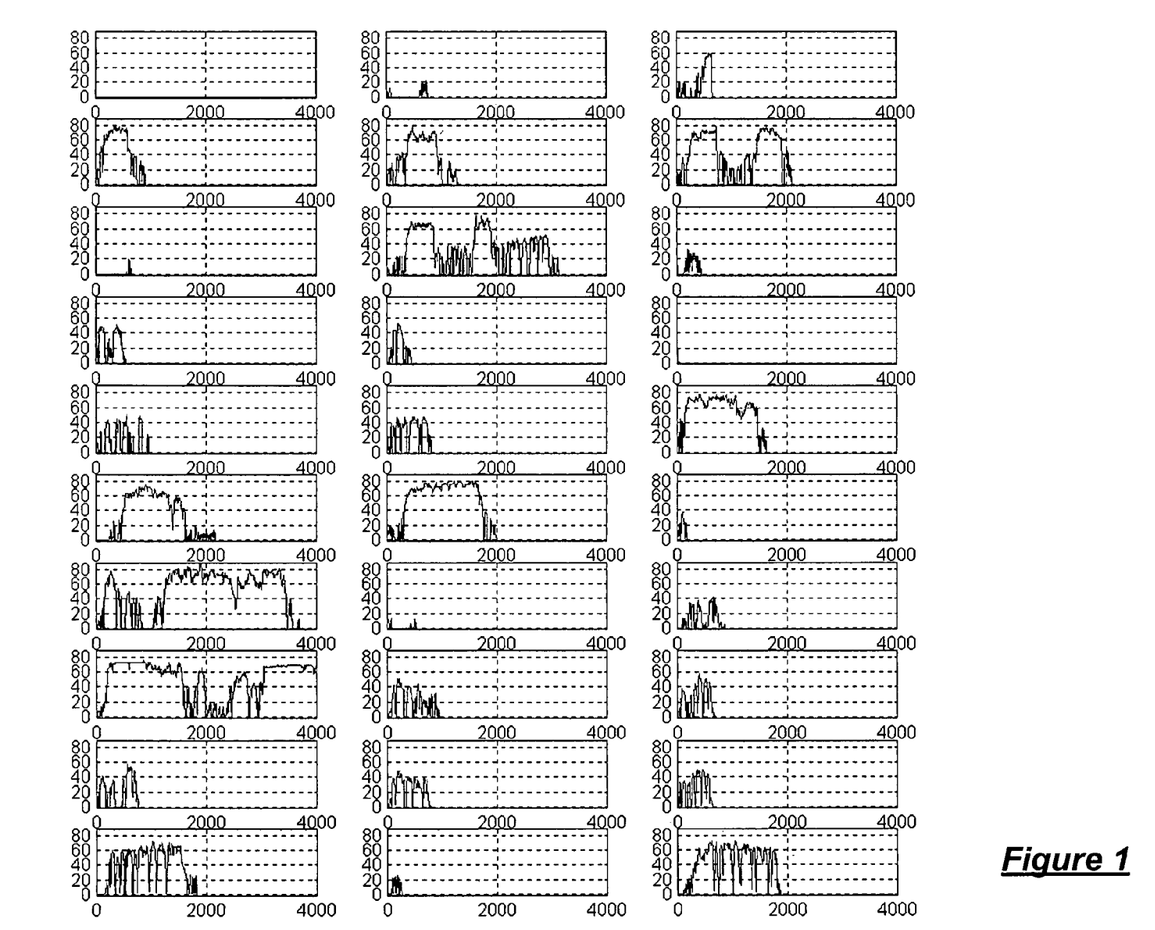
FIG. 1 is a compilation of graphically illustrated training sets for an exemplary vehicle parameter.

Referring now to FIG. 1, an exemplary vehicle parameter includes vehicle velocity. Although the CPM is described herein using velocity, it is appreciated that the CPM can be similarly developed and implemented for any other vehicle operating parameter including, but not limited to, torque, engine RPM, transmission gear, alternator duty cycle, battery load, fuel cell load, emissions or any other stochastic operating parameter for any type of vehicle (e.g., internal combustion engine, fuel cell, electric, hybrid electric, etc.). A training set is provided for multiple parameter cycles. The training set is made up of a plurality of exemplary drive cycles that include velocity versus time.

A conditional probability is the probability of an event occurring given other known information. The CPM models vehicle velocity via a conditional probability that is inferred from the training set. The probabilities of the next velocity ($V_{k+1}$) are conditioned on the history of the previous velocities and the training set. This relationship is characterized as follows:

$$Pr(V_{k+1}|V_k, V_{k-1}, \ldots, V_{k-N}, D) \quad (1)$$

where $V_k$ represents the vehicle velocity at the current time step and D represents the training set.

The training set is reduced to a parameter set and the conditional probabilities are computed based on the parameter set. This relationship is characterized as follows:

$$Pr(V_{k+1}|V_k, V_{k-1}, \ldots, V_{k-N}, \theta) \quad (2)$$

where $V_k$ represents the vehicle velocity at the current time step and $\Theta$ represents the parameter set. The parameter set is a lower order representation of the training set. For example, the training set provides a vector that describes velocity using a large number of variables to provide the exact value of the velocity at each point in time. The parameter set is a lower order approximation of the velocity using a reduced number of variables.

Equation 2 provides the conditional probability that enables viewing the model and using it in a simulation. However, a more compact representation is developed for the conditional probability. More specifically, the compact representation includes a conditional probability and a dynamic equation, which are provided as follows:

$$Pr((V_{k+1} - V_k) \mid V_k, (V_k - V_{k-1}), (V_{k-1} - V_{k-2}), \ldots, (V_{k-N+1} - V_{k-N}), \theta) \quad (3)$$

$$V_{k+1} = V_k + \underbrace{(V_{k+1} - V_k)}_{\text{Value returned from the CPM}} \quad (4)$$

Figure 2:
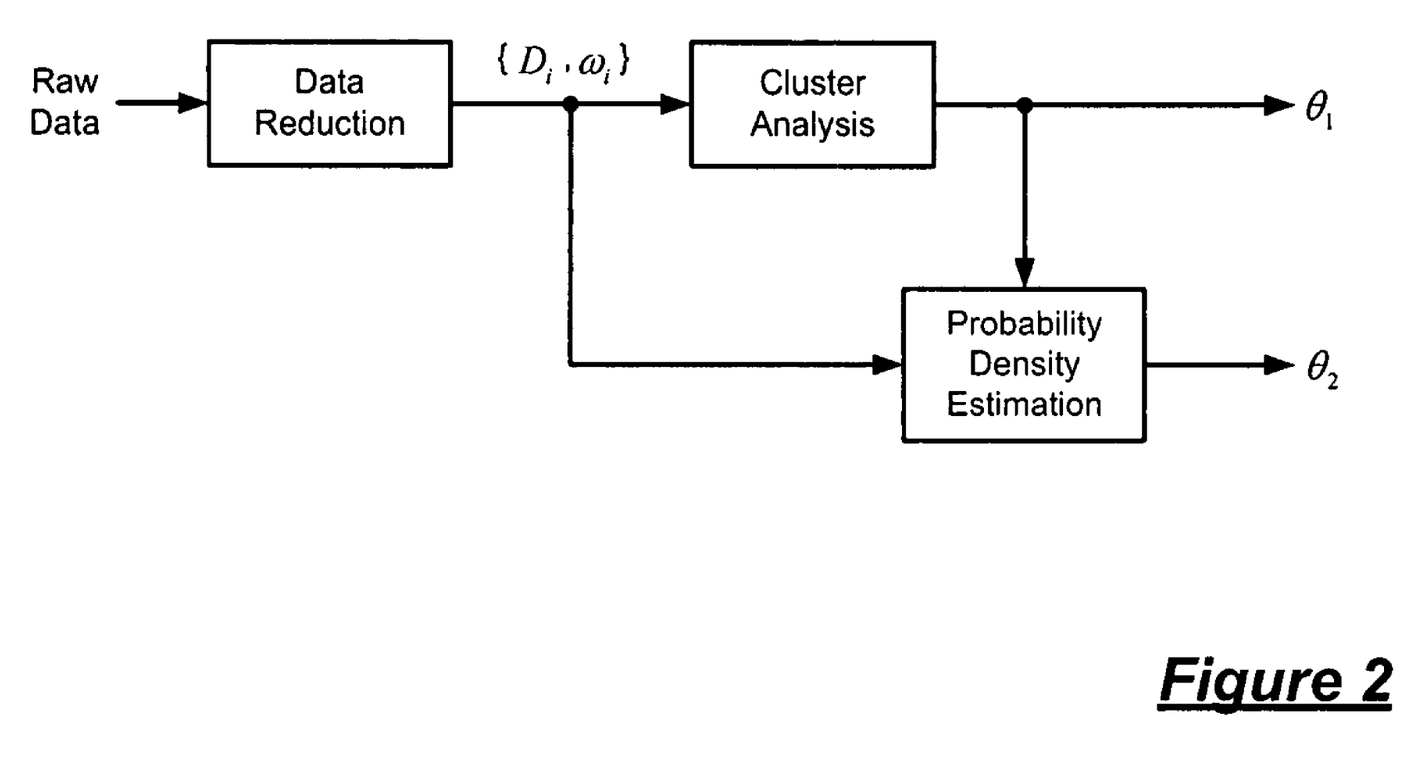
FIG. 2 is a flow diagram illustrating steps performed in developing a conditional probability model (CPM) of the vehicle parameter.

Referring now to FIG. 2, the CPM is developed by initially selecting a model order. The model order determines how far into the past the probability is conditioned. Also, a weighting factor is added to reduce the influence or more distant (i.e., earlier) data. The raw data set is reduced to training vectors in the training set (D) and is partitioned into classes ($\omega_i$). The raw data set includes a set of variable length vectors that represent the velocity of the vehicle at each time step. Analysis is performed on the training vectors to group them into clusters.

The data reduction process starts with the raw data set (D). Because the change in velocity is bounded, the training set ($D_{i,j}$) is built to reflect the history of changes in velocity ($v_{i,k} - v_{i,k-1}$). The changes in velocity are weighted so that past changes are scaled less than more recent changes. To achieve this, a weighting factor ($w_i$) is implemented. An initial classification ($\omega_i$) is assigned to each element in the training set. The classification is based on the next change in velocity and the present velocity. To this point, the following relationships are established:

$$D = \{\underline{V}_1, \underline{V}_2, \ldots, \underline{V}_k\} \quad (5)$$

$$\underline{V}_i = \begin{bmatrix} v_{i,0} & v_{i,1} & \cdots & v_{i,k_{final}} \end{bmatrix}^t \quad (6)$$

$$D_{i,j} = ((v_{i,k} - v_{i,k-1}) \cdot w_1, (v_{i,k-1} - v_{i,k-2}) \cdot w_2, \ldots, (v_{i,k-N+1} - v_{i,k-N}) \cdot w_N) \quad (7)$$

$$\omega_{i,j} = \begin{bmatrix} v_{i,k+1} - v_{i,k} \\ v_{i,k} \end{bmatrix} \quad (8)$$

$D_{i,j}$ and $\omega_{i,j}$ are then used for cluster analysis.

$D_{i,j}$ and $\omega_{i,j}$ are processed through cluster analysis. Cluster analysis can be performed in a number of manners. Cluster analysis is implemented to sort data into groups, or clusters, so that the degree of association is strong between data of the same cluster and weak between data of different clusters. Each cluster describes a class to which its members belong. The clusters are parameterized via a clustering parameter ($\theta$). For example, consider the clustering scheme based on average speed. The clustering parameter is used to define the center points for average speeds for the clustering classes. $D_{i,j}$ and $\omega_{i,j}$ and $\theta$ are processed through probability density estimation (PDE) to provide a PDE mapping.

In one cluster analysis approach, the data is partially classified based on the present velocity ($v_{i,k}$). Principle Component Analysis (PCA) is implemented to reduce the data to a 1-dimensional sub-space. PCA is a cluster analysis tool that captures the variance in a dataset in terms of principle components. The dimensionality of the data is reduced to summarize the most important (i.e. defining) parts while filtering out noise. A principle component is a set of variables that define a projection that encapsulates the maximum amount of variation in a dataset and is orthogonal (i.e., uncorrelated) to the previous principle component of the same dataset. Ten (10) evenly spaced clusters are chosen from the 1-dimensional sub-space. Although this method of cluster analysis provides good results, better performance can be obtained implementing a simpler approach.

Figure 3:
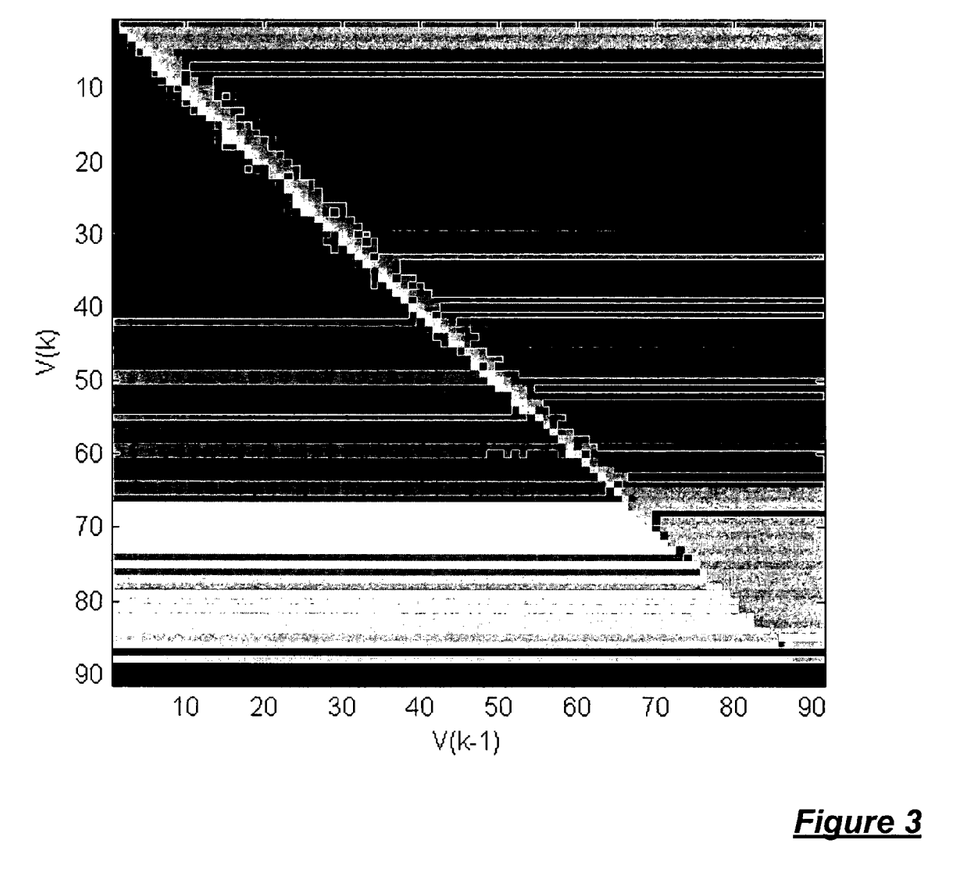
FIG. 3 is a graph illustrating clustering achieved for an exemplary vehicle velocity using a single history sample.
Figure 4:
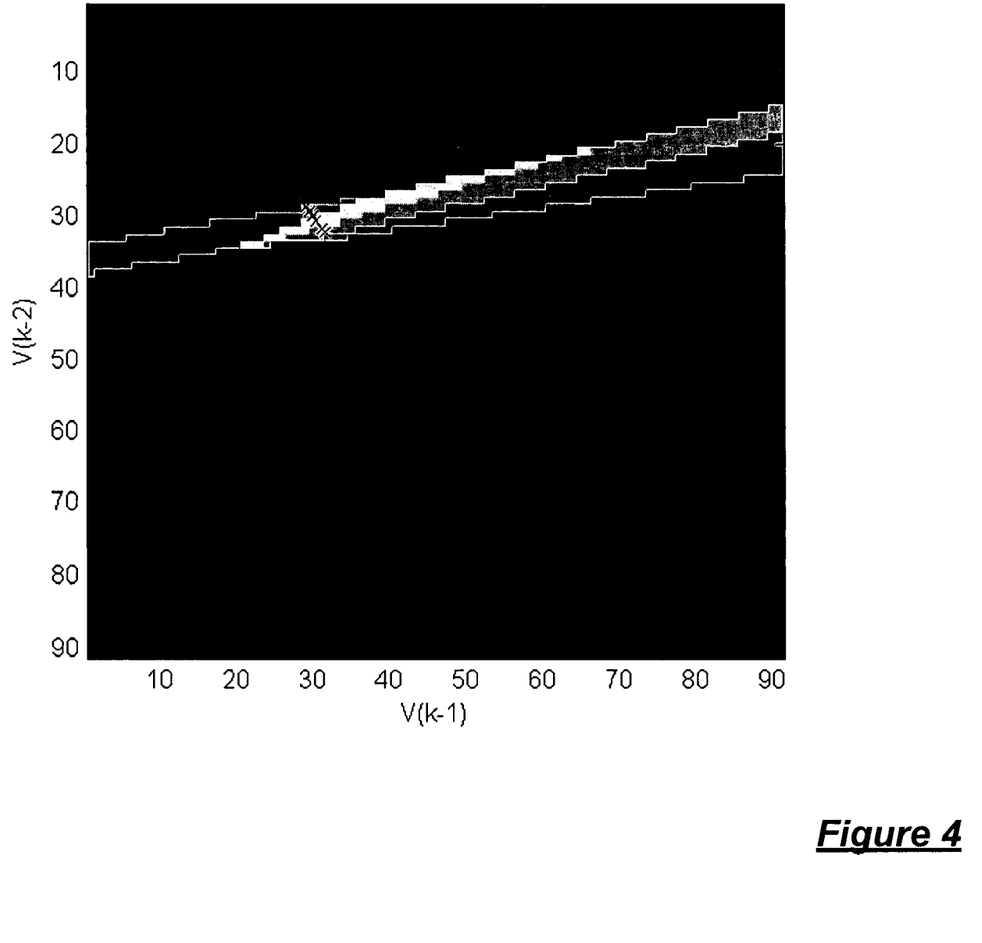
FIG. 4 is a graph illustrating clustering achieved for the exemplary vehicle velocity using multiple history samples.

In an alternative cluster analysis approach, class membership are assigned to the overlapping set of a priori classes (i.e., classes not based on experience) generated through data reduction. Because there is overlap between the classes, the space of training samples is partitioned using the mean of each cluster. FIG. 3 illustrates the clustering for a single velocity (e.g. V(k)=30 mph) achieved when using one history sample. FIG. 4 illustrates the clustering for the single velocity achieved using two history samples. Each shaded section represents an individual cluster. As can be seen, the number of clusters generated is reduced by increasing the number of history samples.

In summary, cluster analysis takes an array of an ending velocity and all of the accelerations that lead up to the ending velocity and reduces them into a manageable set. For example, if a vector is provided with an exemplary ending velocity of 30 mph, there may be several hundred different accelerations in the raw data that resulted in or lead up to 30 mph. The several hundred accelerations are grouped into a few sets (e.g., 4 or 5) using cluster analysis. More specifically, cluster analysis identifies a few center points (e.g., 4 or 5) of the several hundred acceleration vectors. The center points can be associated with different driving maneuvers including, but not limited to, high braking, high acceleration, cruising, light braking and light acceleration.

The center points of the sets determine within which statistical group a particular velocity vector may lie. More specifically, the velocity vector is assigned to the group associated with the center point it is nearest to. For example, if the velocity vector is nearest to the center point of the light acceleration set, the velocity vector is assigned to the light acceleration group and the next or predicted velocity is determined based on the history of velocity vectors that make up the light acceleration set.

Figure 5:
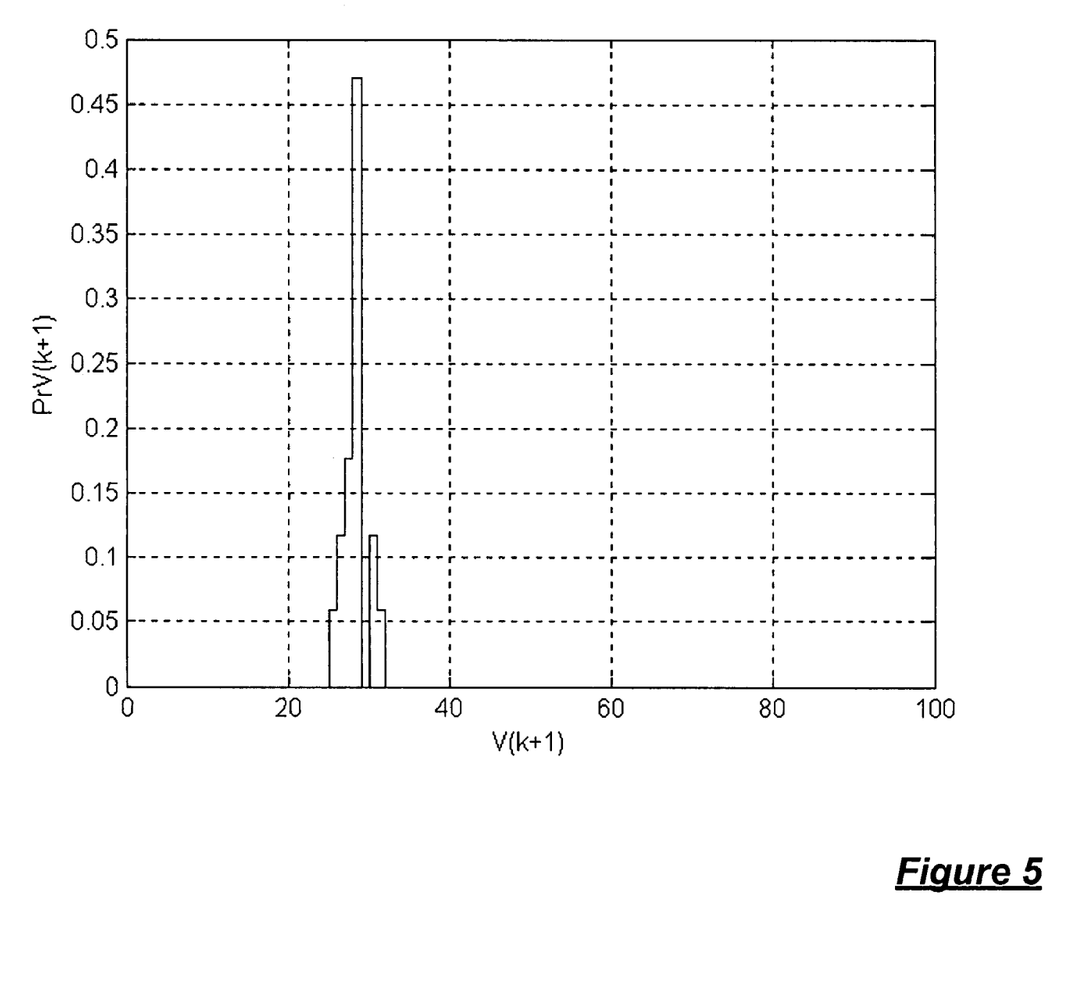
FIG. 5 is a graph of an exemplary probability distribution for a future vehicle velocity.

Referring now to FIG. 5, once the clustering parameters (θ) are found, the training sets ($D_{i,j}$) are sorted by cluster. The distribution of next velocities (V(k+1)) in each cluster is determined. The probability distribution is calculated from a histogram indexed by the next velocities. FIG. 5 illustrates an exemplary plot of one of the resulting probability distributions for an exemplary cluster that contains V(k)=30 and V(K−1)=28. More specifically, the plot illustrates the probability of the next velocity (V(k+1)) given the current velocity (V(k)=30) and the previous velocity (V(k−1)=28). Given the exemplary plot of FIG. 5, there is about a 7% chance V(k+1) will be 24 mph, there is about a 12% chance V(k+1) will be 28 mph and there is about a 45% chance V(k+1) will be 29 mph.

The PCM is an approximation of the true conditional probability of the velocities of the vehicle based on the clustering used. By rounding all of the velocities to integers, the PCM is an extremely compact, exact representation of a very large Markov model. For example, if 50 history velocities are considered over a vehicle velocity range of 0 to 90 mph, the resulting Markov model would be an element of $R^{91^{50} \times 91^{50}}$, a matrix with approximately $8 \cdot 10^{195}$ elements. The PCM generated by the present invention has only 75,000 elements.

Figure 6:
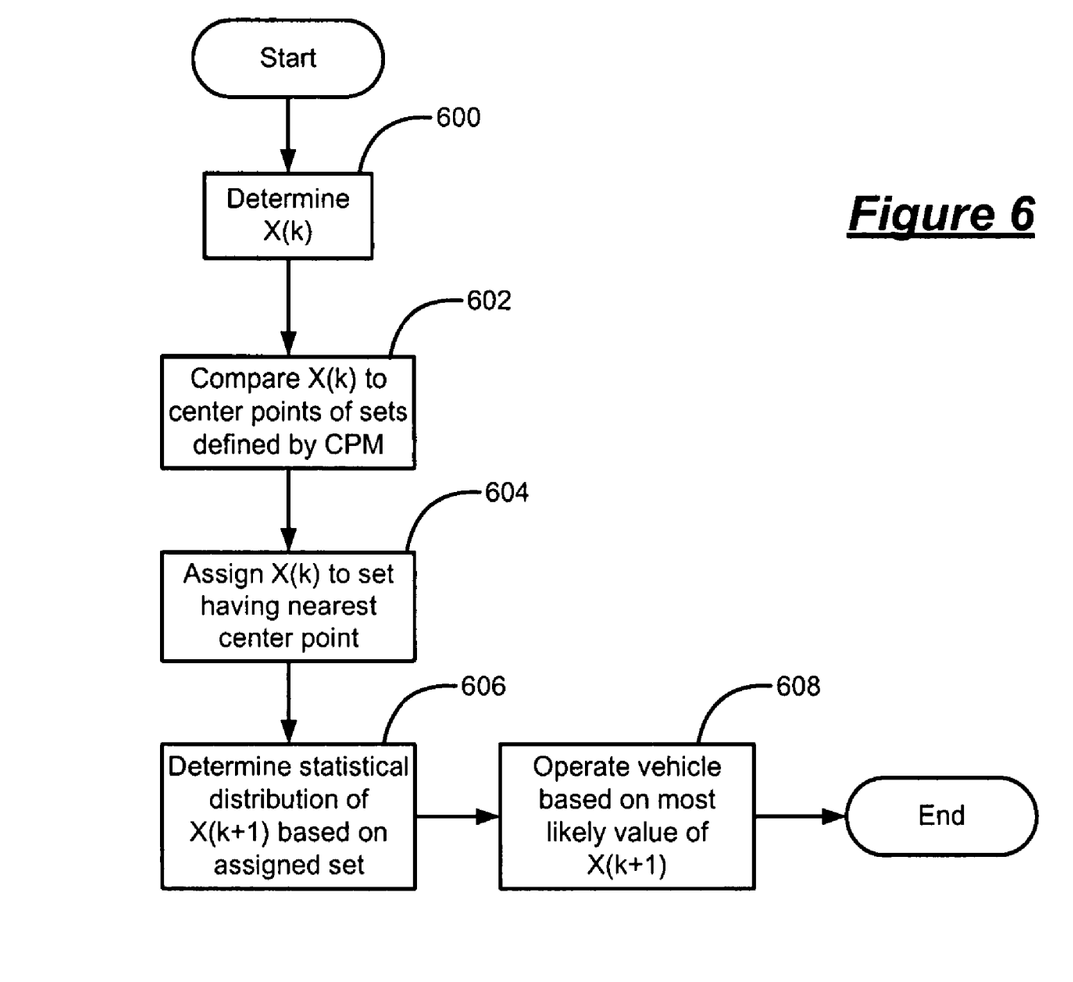
FIG. 6 is a flowchart illustrating steps performed to regulate operation of a vehicle based on the CPM of the present invention.

Referring now to FIG. 6, exemplary steps executed by a vehicle control system will be described in detail. In step 600, control determines the current value of an operating parameter (X(k)) (e.g., velocity). In step 602, control compares X(k) to the center points of sets defined by the CPM of the present invention. Control assigns X(k) to a set having the nearest center point in step 604. In step 606, control determines the statistical distribution of a future operating parameter (X(k+1)) based on the assigned set. In step 608, control operates the vehicle based on the most likely value of X(k+1) and control ends.

The CPM can be implemented to optimally control any dynamic system by estimating future operating characteristics. By processing a present value for an operating condition, a control module can determine a future value of the operating condition or a plurality of future values spread over a statistical distribution. In this manner, the control module can anticipate changes in the operating parameter and regulate vehicle components accordingly.

Those skilled in the art can now appreciate from the foregoing description that the broad teachings of the present invention can be implemented in a variety of forms. Therefore, while this invention has been described in connection with particular examples thereof, the true scope of the invention should not be so limited since other modifications will become apparent to the skilled practitioner upon a study of the drawings, the specification and the following claims.

What is claimed is:

1. A method of operating a vehicle, comprising:
   measuring multiple training sets, each of said training sets including multiple elements, each element storing a vehicle velocity value;
   grouping said elements from said plurality of training sets into velocity groups based on said vehicle velocity values;
   subdividing elements of a first one of said velocity groups into clusters based on elements in said training sets that are prior to said elements of said first velocity group;
   determining a statistical function for a first one of said clusters based on elements in said training sets that are subsequent to said elements of said first cluster;
   receiving a series of vehicle velocity values at a control module of said vehicle;
   selecting one of said clusters based on said series of vehicle velocity values;
   generating a vehicle velocity probability value based on a statistical function of said selected cluster; and
   controlling a system of said vehicle based on said vehicle velocity probability value, wherein said selecting, said generating, and said controlling are performed by said control module.

2. The method of claim 1 wherein said receiving, said selecting, said generating, and said controlling are performed after said statistical function is determined.

3. The method of claim 1 further comprising selecting one of said velocity groups based on a most recent one of said series of vehicle velocity values.

4. The method of claim 3 further comprising selecting one of said clusters within said selected velocity group based on ones of said series of vehicle velocity values that are prior to said most recent one.

5. The method of claim 1 further comprising determining acceleration values for each of said elements of said training sets.

6. The method of claim 5 further comprising determining said acceleration values for one of said elements by computing a difference between said vehicle velocity values of said one of said elements and said vehicle velocity values of said elements that is prior to said one of said elements.

7. The method of claim 1 wherein said subdividing comprises weighting said elements in said training sets that are prior to said elements of said first velocity group.

8. The method of claim 1 wherein said plurality of training sets are measured during non-overlapping times.

9. The method of claim 1 wherein said plurality of training sets are measured in multiple vehicles, and wherein no two of said plurality of training sets are measured during overlapping times on any one of said multiple vehicles 10. The method of claim 1 wherein said statistical function comprises a most likely vehicle velocity value.

11. The method of claim 10 wherein said most likely vehicle velocity value is based on a most frequently occurring vehicle velocity value in a corresponding one of said clusters.

12. The method of claim 1 wherein said statistical function comprises a probability distribution of vehicle velocity values.

13. The method of claim 12 wherein said vehicle velocity probability value comprises a specific vehicle velocity value.

14. The method of claim 13 further comprising determining the specific vehicle velocity value by randomly selecting a value using said probability distribution.

15. The method of claim 14 wherein said random selection is weighted by said probability distribution.

16. The method of claim 1 wherein said vehicle velocity probability value comprises a most likely vehicle velocity value.

17. A method of operating a vehicle, comprising:
   measuring multiple training sets, each of said training sets including multiple elements, each element storing a vehicle velocity value;
   determining a vehicle acceleration value for each of said elements;

associating, with each element of said elements in each training set of said training sets, a predetermined number of said elements previous to said element within said training set and one of said elements subsequent to said element within said training set;

grouping said elements from said plurality of training sets into velocity groups based on said velocity values;

subdividing elements of each of said velocity groups into clusters based on said previous elements associated with said elements;

determining a statistical function for each cluster of said clusters based on said subsequent elements associated with elements of said cluster;

after said statistical functions are determined, receiving a series of vehicle velocity values at a control module of said vehicle;

selecting one of said velocity groups based on a most recent one of said series of vehicle velocity values;

selecting one of said clusters within said selected velocity group based on previous ones of said series of vehicle velocity values; and generating a vehicle velocity probability based on said statistical function of said selected cluster; and controlling a system of said vehicle based on said vehicle velocity probability value, wherein said selecting one of said velocity groups, said selecting one of said clusters, said generating, and said controlling are performed by said control module.

* * * * *

UNITED STATES PATENT AND TRADEMARK OFFICE
CERTIFICATE OF CORRECTION

| | | |
|---|---|---|
| PATENT NO. | : 7,640,148 B2 | Page 1 of 1 |
| APPLICATION NO. | : 11/031363 | |
| DATED | : December 29, 2009 | |
| INVENTOR(S) | : Edward D. Tate, Jr. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 511 days.

Signed and Sealed this

Ninth Day of November, 2010

David J. Kappos
*Director of the United States Patent and Trademark Office*